(12) United States Patent
Castellanos et al.

(10) Patent No.: US 7,003,725 B2
(45) Date of Patent: Feb. 21, 2006

(54) METHOD AND SYSTEM FOR NORMALIZING DIRTY TEXT IN A DOCUMENT

(75) Inventors: Maria Castellanos, Sunnyvale, CA (US); James R. Stinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 947 days.

(21) Appl. No.: 09/905,610

(22) Filed: Jul. 13, 2001

(65) Prior Publication Data

US 2003/0014448 A1    Jan. 16, 2003

(51) Int. Cl.
 *G06F 17/00* (2006.01)
(52) U.S. Cl. ............... 715/532; 715/530; 715/531; 707/2; 707/5; 707/7
(58) Field of Classification Search ......... 715/532, 715/513, 522, 500.1, 530, 531; 707/5, 2, 707/7
See application file for complete search history.

(56) References Cited

U.S. PATENT DOCUMENTS

| | | | |
|---|---|---|---|
| 6,353,840 B1 * | 3/2002 | Saito et al. | 715/517 |
| 6,687,873 B1 * | 2/2004 | Ballantyne et al. | 715/500 |
| 2002/0103834 A1 * | 8/2002 | Thompson et al. | 707/526 |

* cited by examiner

*Primary Examiner*—Stephen Hong
*Assistant Examiner*—Matthew Ludwig

(57) ABSTRACT

A method and system of normalizing dirty text in a document. The present invention creates a thesaurus that evolves over time as new document collections are analyzed. This thesaurus, which is used by an editor, contains standard terms and phrases, and their corresponding variations of these standard terms and phrases. Documents are run through this editor and misspelled words or phrases, joined words, and ad hoc abbreviations are replaced with standard terms from the thesaurus. The present invention also enables normalization of documents in cases where a list of standard terms must be inferred from the corpus of the document. The normalizer will facilitate data mining applications which can not function properly with dirty text, resulting in more accurate analysis of documents. Over time, as the thesaurus evolves, collecting more words and phrases, the process of generating the thesaurus will become more automated.

24 Claims, 5 Drawing Sheets

FIGURE 4 hp_ux
- hp_ux
- hp-ux
- hp/ux
- hpux
- hpuxos
- pax
- pex
- hpa omniback2
- omni back
- omniback
- omniback 2.55
- 2.55 omniback
- 3.0 omniback
- omniback ii
- omnibook
- omniback 3.0
- omniback2
- omniback11 service guard
- service gaurd
- serviceguard
- servicegaurd
- service guard
- mc/serviceguard
- service gard
- serviceguard
- service

FIGURE 5

Normalization Results

Number of documents normalized: 1568 out of 5000

| WORDS | PHRASES | PER DOCUMENT | | |
|---|---|---|---|---|
| | | MIN | AVG | MAX |
| 3385 | 88 | 1 | 22 | 71 |

| TERM | REPLACEMENT TERM | DOC FREQ | TERM FREQ |
|---|---|---|---|
| 10.2 | 10.20 | 50 | 63 |
| os10.20 | 10.20 | 58 | 69 |
| version10.20 | 10.20 | 121 | 171 |
| vr=10.20 | 10.20 | 73 | 73 |
| tpinstal | install | 3 | 16 |
| I'install | install | 0 | 0 |
| patch(es | patch | 21 | 40 |
| xpatches | patch | 4 | 5 |
| megapatch | patch | 11 | 13 |
| patchset | patch | 2 | 9 |
| patch_id | patch | 4 | 5 |
| opened | opened | 6 | 11 |
| sav | server | 0 | 0 |
| hp_9000 | 9000 | 0 | 0 |

METHOD AND SYSTEM FOR NORMALIZING DIRTY TEXT IN A DOCUMENT

BACKGROUND OF THE INVENTION

1. Field of the Invention

The present invention relates to the field of data management systems. More specifically, the present invention pertains to a method and system for normalizing dirty text in a document.

2. Prior Art

In today's business environment, the importance of collecting data that reflect your business activities to achieve competitive advantage is widely recognized. Powerful systems for collecting data and managing it in large databases are in place in most large and mid-range companies and many small companies. It is estimated that the amount of data stored in the world's databases doubles every twenty months. However, all of this data is useless without a method of filtering and organizing it into useful information.

Data mining is a technology that was developed to discover hidden patterns in data to develop models to predict future trends. It uses a variety of statistical analysis techniques to group instances of data into classes or patterns which are not readily apparent to the user. Users can, for example, discover demographic attributes about their customers which were not known before, or predict future behavior based upon previous patterns.

In order to analyze data accurately, the data must be standardized when it is entered into the database. Misspelled words can, for example, skew the data set which will alter the outcome of a data mining query. An example where this could be a serious problem is a customer support center. Here, a customer calls in if they have a problem with a product. Personnel at the support center work with the customer to resolve the problem. The support personnel usually fill out a log which records information about each call.

The support center personnel are often in a hurry to handle the volume of calls coming in, and do not have time to edit their logs. Misspellings, typographical errors, ad hoc abbreviations, and joined words (known collectively as "dirty text") are common problems in these call logs. If a company is trying to examine these call logs to identify products with a history of service problems or what those problems are, they need a system to clean up dirty text.

Accordingly, the need exists for a method of normalizing dirty text from documents prior to them being analyzed. Misspelled words and phrases, as well as ad hoc abbreviations, should be identified and replaced with correctly spelled standardized terms within documents. It is also desirable that this method of normalizing the document can take place in cases where standardized terms do not exist a priori and must be inferred from the corpus of the documents.

SUMMARY OF THE INVENTION

The present invention provides a method and system for removing dirty text from documents prior to them being analyzed. Misspelled words and phrases as well as typographical errors, joined words, and non-standard abbreviations are identified and replaced with correctly spelled standardized terms within documents. It can also normalize documents in cases where a list of standardized terms has not previously existed and must be inferred from the corpus of the documents.

The present invention is a method and system of normalizing dirty text in a document. First, it creates a thesaurus containing standard terms and phrases and their corresponding variations. Then, documents are normalized by replacing misspelled words or phrases, joined words, and ad hoc abbreviations with standard terms from the thesaurus. The present invention also enables normalization of documents in cases where a list of standard terms must be inferred from the corpus of the document. The normalizer will facilitate data mining applications which can not function properly with dirty text, resulting in more accurate analysis of documents. As more documents are run through the normalizer, it will become more automated and accurate as the thesaurus collects more words and phrases.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 4 is an exemplary output from an edit-distance algorithm used in accordance with embodiments of the present invention.

FIG. 5 is an exemplary report generated by the present invention summarizing the results of normalizing a batch of documents in accordance with embodiments of the present invention.

DETAILED DESCRIPTION

A computer implemented method and system for normalizing dirty text from documents is described. While numerous details are set forth in order to provide a thorough understanding of the present invention, it should be understood that it is not intended to limit the invention to this particular embodiment alone. On the contrary, the invention is intended to cover alternatives, modifications and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting", "discarding", "generating", "comparing", "editing", and "processing" or the like, can refer to the actions and processes (e.g., process 300 of FIG. 3) of a computer system or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices.

Figure 1:
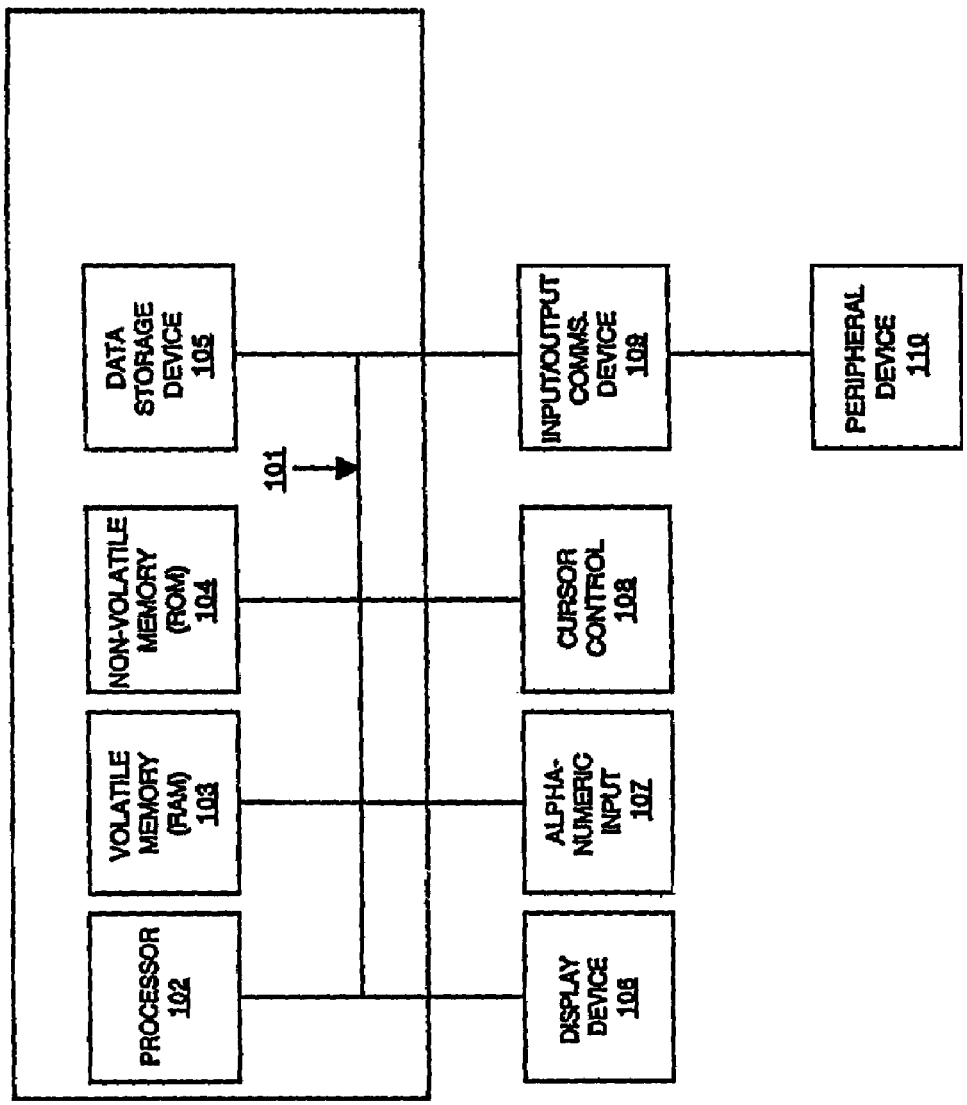
FIG. 1 is a block diagram of an exemplary computer system upon which embodiments of the present invention may be practiced.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes a communication bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, tape drive or the like) for storing vast amounts of data. It should be noted that the software program for performing the normalizing process of the present invention can be stored either in volatile memory 103, non volatile memory 104, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., selecting, editing, generating etc.). In particular, computer system 100 can be coupled in a system for normalizing dirty text in a document.

Figure 2:
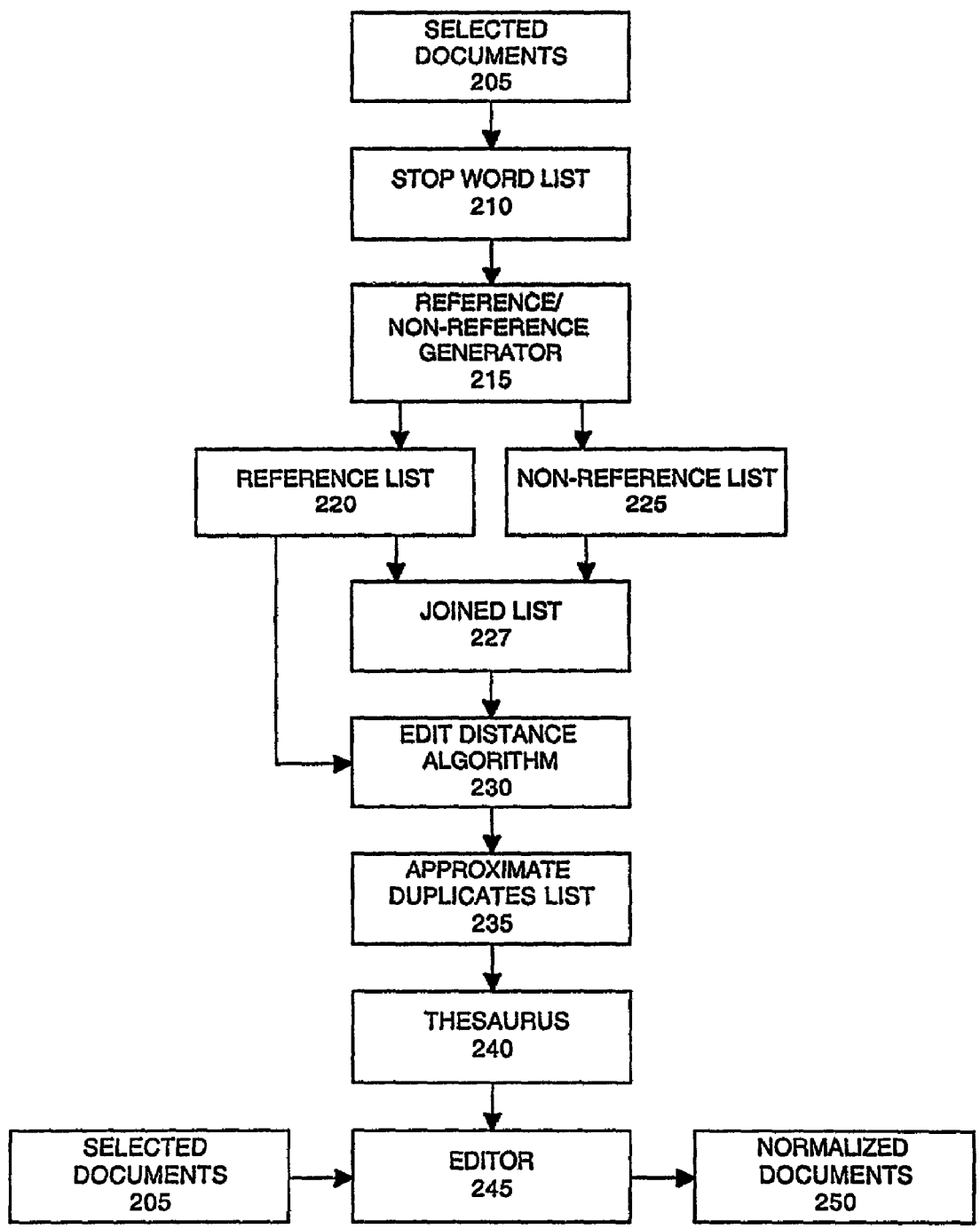
FIG. 2 Is a block diagram showing components used in normalizing dirty text in documents in accordance with one embodiment of the present invention.
Figure 3:
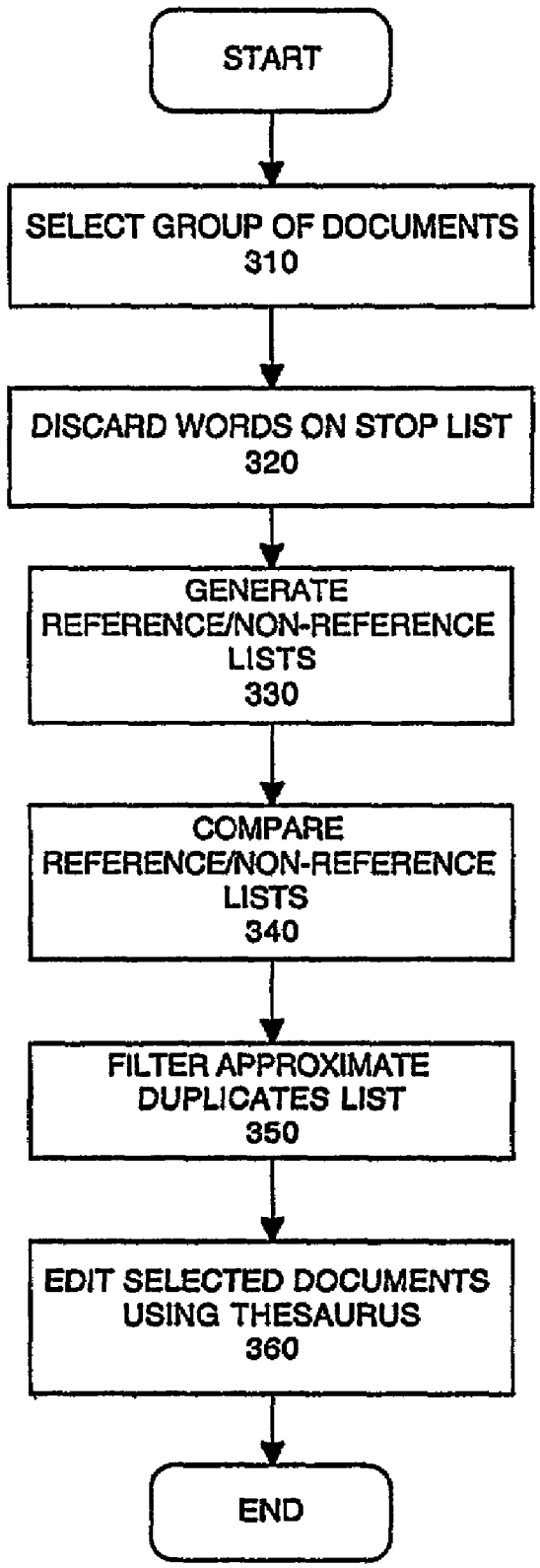
FIG. 3 is a flowchart showing the steps in a method 300 of normalizing dirty text In documents in accordance with one embodiment of the present invention.

FIG. 2 is a block diagram showing components used in normalizing dirty text in documents in accordance with one embodiment of the present invention as set forth in flow chart 300 of FIG. 3. For purposes of clarity, the following discussion will utilize the block diagram of FIG. 2 in conjunction with flow chart 300 of FIG. 3, to clearly describe one embodiment of the present invention. As will be described in detail below, the method of the present invention deals with a method to normalize dirty text in documents.

With reference to FIG. 2 and to step 310 of FIG. 3, a group of documents (205) is selected for normalizing. These documents have previously been processed, eliminating times, dates, and phone numbers.

With reference to FIG. 2 and to step 320 of FIG. 3, any words from the selected documents (205) that are on stop word list (210) are discarded. Stop words are words which are regarded as irrelevant to the current domain. Removing these words at this point reduces the amount of work to be done and increases the speed of the process.

With reference to FIG. 2 and to step 330 of FIG. 3, the remaining words pass through a reference/non-reference word list generator (215). First, word frequency is counted for each word in the set of selected documents (205). Words with special characters embedded within are placed on a reference word list (220). They are placed there as it is assumed at this stage that they are probably technical terms or proprietary names. Next, all the remaining words are run through a spell checker program. Words that are recognized as correctly spelled are placed on the reference word list (220) and all unrecognized words are placed on a non-reference word list (225). The words on the non-reference word list (225) can be misspelled, typographical errors, joined words, ad hoc abbreviations, or technical terms that do not exist in the current spell checker dictionary.

Next, pairs of consecutive words are formed by moving a two word window through the selected documents (205) one word at a time. Phrases are permuted to identify equivalent phrases. Then, the frequency of a phrase or its equivalent occurring is counted. Phrases that have a special character embedded in them are placed on the reference word list (220). For the remaining phrases, if the spell checker recognized the components of the phrase, it is placed on the reference word list (220), otherwise, it is put on the non-reference word list (225). This procedure can be generalized to n-word phrases.

A set of thresholds is then set based on the frequency of a word or phrase occurring within the selected documents (205). It is assumed that a correct term appears more frequently than an instance of dirty text. Therefore, the threshold for the reference word list (220) will normally be set higher (e.g., a frequency of 25 or higher keeps a word on the reference word list). The thresholds can be set according to the requirements of the desired thesaurus. The threshold on the reference word list (220) determines the candidate entries in the thesaurus, while the threshold on the non-reference word list (225) will determine how low in frequency the variations of reference terms in the candidate entries can be and still be relevant.

Finally, if there are any existing reference lists for this particular domain (e.g., a domain specific dictionary), they can be merged with the newly created reference word list (220).

Referring to FIG. 2 and to step 340 of FIG. 3, the reference word list (220) and the non-reference word list (225) are compared using an edit distance algorithm (230) to create an approximate duplicates list (235). An edit distance algorithm can detect the similarity between words by detecting the number of edit operations that are needed to convert one string of letters into another. It is assumed that words that are misspelled or contain typographical errors only differ from the correct word by a few keystrokes. In one embodiment, the Smith-Waterman algorithm, which was developed to detect the difference in DNA strings, is used. Words that are considered sufficiently close to a reference word, according to a parameter set by the user, are considered its approximate duplicates and placed on the approximate duplicates list as a group. Words that are far apart are filtered out. The results of the comparisons are saved for later use. When new documents arrive, pairs of words and phrases previously compared will not be compared again.

As was previously stated, the closeness parameter is set by the user. In one embodiment, approximate duplicates are identified for a small subset of reference terms. The reference and non-reference terms are run through the edit distance algorithm using different settings of the parameter until the user is satisfied with the parameter value that obtains as many correct candidate duplicates as is possible. In most cases, it is anticipated that the user will bias toward obtaining as complete a set of duplicates as possible, even if it means including incorrect candidates as these incorrect candidates can be filtered out later. In one embodiment, the parameter is a function of the word length itself as it has been found that shorter words (e.g., words with four letters or less) generate too many duplicates using the same parameter value as longer words.

In one embodiment, a copy of the reference word list (220) is joined with the non-reference word list (225). Each word or phrase in the joined list (227) is then compared with each word or phrase in the reference word list (220) and, using the parameter previously set, the approximate duplicates are placed on the approximate duplicate list (235). Non-reference words that do not get paired with a reference word can either be discarded as irrelevant or may be included as a new term on the reference word list (220). Word frequency will determine whether a word gets discarded or placed on the reference word list (220) as it is assumed that a relevant new term will appear more frequently in the document collection than an irrelevant word.

FIG. 4 is an exemplary approximate duplicates list which corresponds to approximate duplicates list (235) in FIG. 2, created in accordance with embodiments of the present invention. The first column shows a word or phrase from the reference word list (220) (e.g., hp-ux, omniback2, and service guard) followed by a list of approximate duplicates as detected by the edit distance algorithm. As shown in FIG. 4, the approximate duplicates list (235) associates a variety of misspellings, ad hoc abbreviations, and joined words with words from the reference word list (220).

Referring still to FIG. 2 and to step 350 of FIG. 3, the approximate duplicates list (350) is manually filtered to create a thesaurus (240) by identifying the legitimate approximate duplicates of the candidate thesaurus entries. Each thesaurus entry consists of a standard term and a list of its variations. In one embodiment, a person with expertise in the domain of the selected documents chooses which approximate duplicates are legitimate and which terms and phrases for each approximate duplicate group are to be considered standard terms.

In another embodiment, when standard terms upon which to build a reference list do not previously exist, all non-stop words in the corpus constitute the joined list (227). Each word or phrase in the joined list (227) is then compared with all other words or phrases in the joined list (227) to identify the approximate duplicate groups. Each group on the approximate duplicates list (235) is manually edited by filtering out the non-legitimate approximate duplicates and choosing a standard term for the group. The rest of the terms in the group will be considered variations of that standard term.

The amount of manual editing will diminish over time since prior manual efforts are saved for later use. Only newly discovered approximate duplicates need to be presented to the domain expert for examination. Additionally, step 350 of FIG. 3 can be semi-automated by taking Into account the context of the words and phrases on the approximate duplicates list and the corresponding reference term.

Referring to FIG. 2 and to step 360 of FIG. 3, the entire group of selected documents (205) is edited with an editor (245) which uses the thesaurus (240) to automatically replace misspelled words, typographical errors, joined words, and non-standard abbreviations with standard terms. Every non-reference word or phrase in a document is replaced with a standard term by the editor. The normalized documents are now ready for any further processing or analysis needed by the user. Because of the standardization of terms in the normalized documents, data mining techniques will be facilitated. Additionally, a thesaurus of standardized terms which has not previously existed is created from the selected documents.

FIG. 5 illustrates a partial exemplary report which summarizes the normalization conducted using the present invention over a collection of 5000 documents. The top table shows how many words and phrases were replaced in the process of normalizing a group of documents. It also shows the minimum, maximum, and average number of substitutions performed on each document. The lower table shows incorrect or misspelled terms in the left column and the standard term it was replaced with in the second column. The third and fourth columns show how many documents the incorrect term occurred in and how many times it showed up in the group of documents respectively.

Thus, the present invention provides a method and system for removing dirty text from documents prior to them being analyzed. Misspelled words and phrases as well as non-standard abbreviations are replaced with correctly spelled standardized terms within documents. It can also normalize documents in cases where a list of standardized terms has not previously existed and must be inferred from the corpus of the documents.

The preferred embodiment of the present invention, a method and system of normalizing dirty text In a document, is thus described. While the present invention has been described In particular embodiments, It should be appreciated that the present invention should not be construed as limited by such embodiments, but rather construed according to the following claims.

What is claimed is:

1. A method for normalizing text in a document, said method comprising:
   a) generating a list of reference words and phrases and a list of non-reference words and phrases from a selected group of documents;
   b) comparing said list of reference words and phrases with a joined list containing said reference words and phrases and said non-reference words and phrases, using an edit-distance algorithm to create an approximate duplicates list;
   c) filtering said approximate duplicates list to create a thesaurus of standard words and phrases and their variations; and
   d) editing said selected group of documents with an editor operable to use said thesaurus to replace a word or phrase on said approximate duplicates list with said standard words and phrases.

2. The method of claim 1, wherein words and phrases from said selected group of documents that are on a stop word list are discarded.

3. The method of claim 2, wherein words and phrases not discarded comprise said lists of reference and non-reference words and phrases.

4. The method of claim 1, wherein said generating further comprises:
   a1) counting the frequency of occurrence of a plurality of words and phrases from said selected group of documents;
   a2) placing words and phrases with special characters embedded within them on said reference word list;
   a3) processing words and phrases from said selected group of documents not already on said reference word list with a spell-checker program, wherein words and phrases that are recognized as correctly spelled are placed on said reference word list and all unrecognized words and phrases are placed on said non-reference word list;
   a4) setting a frequency of occurrence threshold for said reference word list, wherein words and phrases which have a frequency of occurrence below said threshold are discarded as irrelevant; and
   a5) setting a word frequency threshold for said non-reference word list, wherein words and phrases which have a frequency of occurrence above said threshold remain on said non-reference word list.

5. The method of claim 4, wherein said reference word list can be merged with an existing domain specific dictionary.

6. The method of claim 1, wherein said comparing comprises:

b1) setting parameters for said edit distance algorithm;
   b2) combining said reference word list with said non-reference word list to create said joined list;
   b3) comparing words and phrases on said joined list with words and phrases on said reference word list using said edit distance algorithm; and
   b4) pairing words and phrases from said non-reference word list with words and phrases from said reference word list, wherein pairs of said words and phrases which are within said parameters of said edit distance algorithm are placed on said approximate duplicates list.

7. The method of claim 6, wherein said comparing further comprises:
   setting a parameter, based upon frequency of occurrence, for words and phrases not on said approximate duplicates list;
   placing words and phrases not on said approximate duplicates list which are within said parameter on said reference word list; and
   discarding words and phrases not on said approximate duplicates list which are outside said parameter.

8. The method of claim 1, wherein said filtering comprises:
   c1) identifying the standard words and phrases to be contained within said thesaurus from said reference word list;
   c2) manually filtering said list of approximate duplicates, wherein approximate duplicates are paired with a standard word within said thesaurus; and
   c3) manually filtering said list of approximate duplicates, wherein approximate duplicates are paired with a standard phrase within said thesaurus.

9. A computer system comprising:
   a bus;
   a memory unit coupled to said bus; and
   a processor coupled to said bus, said processor for executing a method for normalizing text in a document, said method comprising:
   a) generating a list of reference words and phrases and a list of non-reference words and phrases from a selected group of documents;
   b) comparing said list of reference words and phrases with a joined list containing said reference words and phrases and said non-reference words and phrases using an edit-distance algorithm to create an approximate duplicates list;
   c) filtering said approximate duplicates list to create a thesaurus of standard words and phrases and their variations; and
   d) editing said selected group of documents with an editor operable to use said thesaurus to replace a word or phrase on said approximate duplicates list with said standard words and phrases.

10. The computer system of claim 9, wherein words and phrases from said selected group of documents that are on a stop word list are discarded.

11. The method of claim 10, wherein words and phrases not discarded comprise said lists of reference and non-reference words and phrases.

12. The computer system of claim 9, wherein said generating further comprises:
   a1) counting the frequency of occurrence of a plurality of words and phrases from said selected group of documents;
   a2) placing words and phrases with special characters embedded within them on said reference word list;
   a3) processing words and phrases from said selected group of documents not already on said reference word list with a spell-checker program, wherein words and phrases that are recognized as correctly spelled are placed on said reference word list and all unrecognized words and phrases are placed on said non-reference word list;

a4) setting a frequency of occurrence threshold for said reference word list, wherein words and phrases which have a frequency of occurrence below said threshold are discarded as irrelevant; and a5) setting a word frequency threshold for said non-reference word list, wherein words and phrases which have a frequency of occurrence above said threshold remain on said non-reference word list.

13. The computer system of claim 12, wherein said reference word list can be merged with an existing domain specific dictionary.

14. The computer system of claim 9, wherein said comparing comprises:

b1) setting parameters for said edit distance algorithm;

b2) combining said reference word list with said non-reference word list to create a joined list;

b3) comparing words and phrases on said joined list with words and phrases on said reference word list using said edit distance algorithm; and b4) pairing words and phrases from said non-reference word list with words and phrases from said reference word list, wherein pairs of said words and phrases which are within said parameters of said edit distance algorithm are placed on said approximate duplicates list.

15. The computer system of claim 14, wherein said comparing further comprises:

setting a parameter, based upon frequency of occurrence, for words and phrases not on said approximate duplicates list;

placing words and phrases not on said approximate duplicates list which are within said parameter on said reference word list; and discarding words and phrases not on said approximate duplicates list which are outside said parameter.

16. The computer system of claim 9, wherein said filtering comprises:

c1) identifying the standard words and phrases to be contained within said thesaurus from said reference word list;

c2) manually filtering said list of approximate duplicates, wherein approximate duplicates are paired with a standard word within said thesaurus; and c3) manually filtering said list of approximate duplicates, wherein approximate duplicates are paired with a standard phrase within said thesaurus.

17. A computer-usable medium having computer-readable program code embodied therein for causing a computer system to perform:

a) generating a list of reference words and phrases and a list of non-reference words and phrases from a selected group of documents;

b) comparing said list of reference words and phrases with a joined list containing said reference words and phrases and said non-reference words and phrases using an edit-distance algorithm to create an approximate duplicates list;

c) filtering said approximate duplicates list to create a thesaurus of standard words and phrases and their variations; and d) editing said selected group of documents with an editor operable to use said thesaurus to replace a word or phrase on said approximate duplicates list with said standard words and phrases.

18. The computer-usable medium of claim 17, wherein words and phrases from said selected group of documents that are on a stop word list are discarded.

19. The method of claim 18, wherein words and phrases not discarded comprise said lists of reference and non-reference words and phrases.

20. The computer-usable medium of claim 17, wherein said generating further comprises:

a1) counting the frequency of occurrence of a plurality of words and phrases from said selected group of documents;

a2) placing words and phrases with special characters embedded within them on said reference word list;

a3) processing words and phrases from said selected group of documents not already on said reference word list with a spell-checker program, wherein words and phrases that are recognized as correctly spelled are placed on said reference word list and all unrecognized words and phrases are placed on said non-reference word list;

a4) setting a frequency of occurrence threshold for said reference word list, wherein words and phrases which have a frequency of occurrence below said threshold are discarded as irrelevant; and a5) setting a word frequency threshold for said non-reference word list, wherein words and phrases which have a frequency of occurrence above said threshold remain on said non-reference word list.

21. The method of claim 20, wherein said reference word list can be merged with an existing domain specific dictionary.

22. The computer-usable medium of claim 17, wherein said comparing comprises:

b1) setting parameters for said edit distance algorithm;

b2) combining said reference word list with said non-reference word list to create a joined list;

b3) comparing words and phrases on said joined list with words and phrases on said reference word list using said edit distance algorithm; and b4) pairing words and phrases from said non-reference word list with words and phrases from said reference word list, wherein pairs of said words and phrases which are within said parameters of said edit distance algorithm are placed on said approximate duplicates list.

23. The computer-usable medium of claim 22, wherein said comparing further comprises:

setting a parameter, based upon frequency of occurrence, for words and phrases not on said approximate duplicates list;

placing words and phrases not on said approximate duplicates list which are within said parameter on said reference word list; and discarding words and phrases not on said approximate duplicates list which are outside said parameter.

24. The computer-usable medium of claim 17, wherein said filtering comprises:

c1) identifying the standard words and phrases to be contained within said thesaurus from said reference word list;

c2) manually filtering said list of approximate duplicates, wherein approximate duplicates are paired with standard words and phrases within said thesaurus; and c3) manually filtering said list of approximate duplicates, wherein approximate duplicates are paired with a standard phrase within said thesaurus.

* * * * *

UNITED STATES PATENT AND TRADEMARK OFFICE
CERTIFICATE OF CORRECTION

PATENT NO. : 7,003,725 B2
APPLICATION NO. : 09/905610
DATED : February 21, 2006
INVENTOR(S) : Maria Castellanos et al.

Page 1 of 1

It is certified that error appears in the above-identified patent and that said Letters Patent is hereby corrected as shown below:

In column 2, line 50, after "A" delete "computer implemented".

In column 7, line 18, in Claim 1, after "A" insert -- computer implemented --.

Signed and Sealed this

Fourteenth Day of July, 2009

JOHN DOLL
*Acting Director of the United States Patent and Trademark Office*